(12) United States Patent
Al Ibrahim et al.

(10) Patent No.: US 11,747,138 B2
(45) Date of Patent: Sep. 5, 2023

(54) SHAFT ALIGNMENT ONLINE CONDITION MONITORING SYSTEM USING PLANETARY GEAR APPARATUS

(71) Applicant: SAUDI ARABIAN OIL COMPANY, Dhahran (SA)

(72) Inventors: Mohamad Abduladhim Al Ibrahim, Al-Hassa (SA); Salem Khalid Al Turki, Hafouf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 376 days.

(21) Appl. No.: 17/182,552

(22) Filed: Feb. 23, 2021

(65) Prior Publication Data

US 2022/0268572 A1 Aug. 25, 2022

(51) Int. Cl.
*G01B 11/27* (2006.01)
*F16H 57/08* (2006.01)
*F16H 1/46* (2006.01)
*F16H 1/36* (2006.01)
*B60K 25/00* (2006.01)

(52) U.S. Cl.
CPC ............ *G01B 11/272* (2013.01); *F16H 1/36* (2013.01); *F16H 1/46* (2013.01); *F16H 57/082* (2013.01); *B60K 2025/005* (2013.01)

(58) Field of Classification Search
CPC ... F16H 1/36; F16H 57/082; B60K 2025/005; G01B 11/272
See application file for complete search history.

(56) References Cited

U.S. PATENT DOCUMENTS

| | | | |
|---|---|---|---|
| 3,954,028 A * | 5/1976 | Windish | ................. F16H 3/663 475/344 |
| 4,507,926 A | 4/1985 | Teckentrup et al. | |
| 4,518,855 A | 5/1985 | Malak | |
| 5,077,905 A | 1/1992 | Murray, Jr. | |
| 6,411,375 B1 * | 6/2002 | Hinkle | ................. G01B 11/272 33/645 |
| 6,915,582 B1 | 7/2005 | Engels | |
| 8,585,529 B2 * | 11/2013 | Bishop | .................... F16H 29/00 475/210 |

(Continued)

FOREIGN PATENT DOCUMENTS

JP    2014038330 A    2/2014

*Primary Examiner* — Yaritza Guadalupe-McCall
(74) *Attorney, Agent, or Firm* — Osha Bergman Watanabe & Burton LLP

(57) ABSTRACT

A system includes a first planetary gear set comprising a first sun gear, at least one planetary gear, and a first ring gear designed to rotate at a speed lower than an operating speed of rotating equipment. The system further comprises a second planetary gear set comprising a second sun gear, at least one planetary gear, and a second ring gear designed to rotate at a speed lower than the operating speed of the rotating equipment. The system further comprises at least one laser source installed on the first ring gear of the first planetary gear set and at least one laser receiver installed on the second ring gear of the second planetary gear set. The at least one laser source corresponds with the at least one laser receiver to measure alignment readings while the rotating equipment is rotating at speeds up to and including the operating speed.

20 Claims, 5 Drawing Sheets

(56) References Cited

U.S. PATENT DOCUMENTS

| | | | |
|---|---|---|---|
| 8,745,888 B2* | 6/2014 | Silliman | G01N 29/2437 |
| | | | 73/632 |
| 9,146,098 B2 | 9/2015 | Sansom | |
| 9,366,527 B2 | 6/2016 | Weihrauch | |
| 9,664,254 B2* | 5/2017 | McCloy | F01L 9/20 |
| 11,105,202 B2* | 8/2021 | Ibrahim | F01D 17/02 |
| 2004/0261278 A1 | 12/2004 | Bodgren et al. | |
| 2011/0036605 A1* | 2/2011 | Leong | B25F 5/001 |
| | | | 173/47 |
| 2011/0190093 A1* | 8/2011 | Bishop | F16H 3/44 |
| | | | 475/296 |
| 2013/0219733 A1* | 8/2013 | Smith | F01D 25/285 |
| | | | 33/645 |
| 2014/0049784 A1 | 2/2014 | Woloschyn | |
| 2015/0059347 A1* | 3/2015 | Clayton | F02C 7/36 |
| | | | 60/772 |
| 2015/0065292 A1* | 3/2015 | Kurth | F16H 1/46 |
| | | | 475/337 |
| 2016/0348759 A1* | 12/2016 | Mccloy | F16H 1/2863 |
| 2017/0342819 A1 | 11/2017 | Gollehon et al. | |
| 2020/0124409 A1 | 4/2020 | Jozokos | |
| 2020/0263546 A1* | 8/2020 | Ibrahim | F01D 17/02 |
| 2022/0268572 A1* | 8/2022 | Al Ibrahim | F16H 1/36 |

\* cited by examiner

SHAFT ALIGNMENT ONLINE CONDITION MONITORING SYSTEM USING PLANETARY GEAR APPARATUS

BACKGROUND

Rotating equipment requires proper alignment of the shafts in order for the rotating equipment to perform properly and efficiently. When misalignment occurs, vibrations may occur which cause excessive amounts of stress on the rotating components and lubricants. This stress may cause accelerated wear and component degradation of the rotating equipment. During operation, shaft misalignment is commonly detected by utilizing vibration analysis, thermography, or vibration phase readings. Oftentimes, shaft misalignment is not detected until the rotating equipment fails or severe damage has occurred. When misalignment is detected, the machinery is shut down and a preliminary check of all key components is performed to ensure all components are in working order. Repairs are made and shaft re-alignment is performed by using tools such as a straightedge ruler, dial indicators, or laser guides.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a system and method for monitoring shaft alignment. In general, and in one embodiment, the system comprises a first planetary gear set comprising a first sun gear, having first sun gear teeth, designed to rotate at an operating speed of rotating equipment, at least one planetary gear, having planetary gear teeth, and a first ring gear, having first ring gear teeth, designed to rotate at a speed lower than the operating speed of the rotating equipment. The system further comprises a second planetary gear set comprising a second sun gear, having second sun gear teeth, designed to rotate at the operating speed of the rotating equipment, at least one planetary gear, having planetary gear teeth, and a second ring gear, having second ring gear teeth, designed to rotate at a speed lower than the operating speed of the rotating equipment. The system further comprises at least one laser source installed on the first ring gear of the first planetary gear set and at least one laser receiver installed on the second ring gear of the second planetary gear set. The at least one laser source corresponds with the at least one laser receiver to measure alignment readings while the rotating equipment is rotating at speeds up to and including the operating speed, and the alignment readings are read and processed by a laser alignment data collector connected to a computer processor.

In further embodiments, a method for monitoring shaft alignment comprises installing a laser source onto a first ring gear of a first planetary gear set wherein the first ring gear has first ring gear teeth and the first planetary gear set comprises at least one planetary gear having planetary gear teeth. Installing a laser receiver, connected to a laser alignment data collector, onto a second ring gear of a second planetary gear set wherein the second ring gear has second ring gear teeth and the second planetary gear set comprises at least one planetary gear having planetary gear teeth. Emitting a laser beam from the laser source and receiving the laser beam at the laser receiver such that the laser alignment data collector processes reception of the laser beam and transmits alignment data to a computer processor. The first planetary gear set and the second planetary gear set are installed opposite and facing one another in rotating equipment and the rotating equipment is rotating at a speed up to and including an operating speed. The first ring gear and the second ring gear are rotating at a speed less than the speed of the rotating equipment.

Other aspects and advantages of the claimed subject matter will be apparent from the following description and the appended claims.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Shaft misalignment of rotating equipment may cause increased vibrations, increased friction, excessive energy consumption, and premature failure of equipment. Common indicators of shaft misalignment only occur after damage has occurred to one or more components of the rotating equipment. The ability to monitor shaft alignment while the rotating machines are operating is desirable. To this end, embodiments disclosed herein relate to a system utilizing conventional shaft alignment technology and planetary gear sets to monitor the shaft alignment of rotating equipment while the rotating equipment is operating.

Figure 1A:
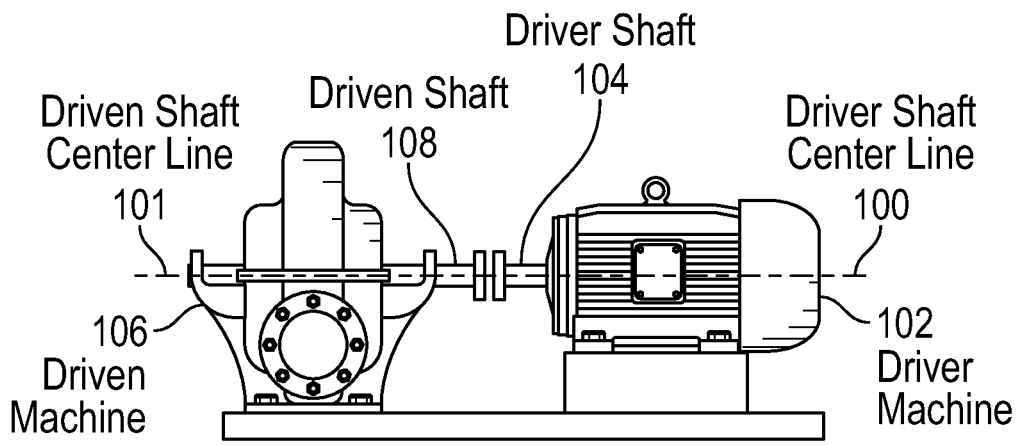
FIG. 1A-1C shows proper alignment, parallel/offset misalignment, and angular misalignment of rotating equipment in accordance with one or more embodiments.

FIG. 1A depicts rotating equipment with proper shaft alignment along the shaft centerlines (100, 101). The rotating equipment comprises a driver machine (102) with a driver shaft (104) and a driven machine (106) with a driven shaft (108). The driver shaft (104) and the driven shaft (108) are the rotating elements within the rotating equipment. The shafts (104, 108) are commonly circular in cross section.

The driver machine (102) is the machine that provides power input to the rotating equipment. The driven machine (106) is the unit that receives the power input from the driver machine (102). For energy to be transmitted from the driver machine (102) to the driven machine (106) the driver shaft (104) must be connected to the driven shaft (108). This connection is called shaft coupling.

Common types of shaft couplings include beam couplings, bellows couplings, chain couplings, jaw couplings, diaphragm couplings, disc couplings, gear couplings, grid couplings, Oldham couplings, Schmidt couplings, clamping couplings, etc. The driver machine (102) has a driver shaft center line (100) and the driven machine (106) has a driven shaft center line (101). A shaft center line (100, 101) is an infinitesimal line passing through the geometric center of a machinery shaft (104, 108). This shaft center line (100, 101) is commonly located along the machined centers of each end of the shafts (104, 108). For the rotating equipment to be properly aligned, the driver shaft center line (100) must be in line with the driven shaft center line (101) as depicted in FIG. 1a.

Figure 1B:
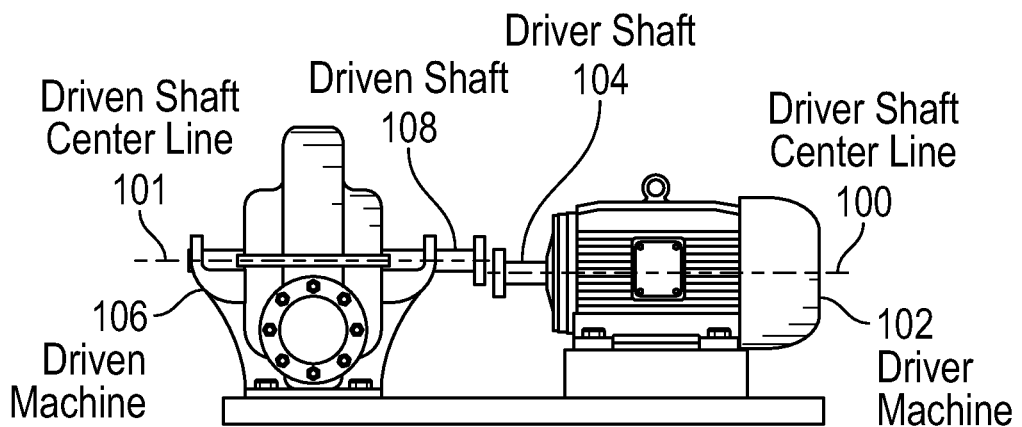

FIG. 1B depicts rotating equipment with parallel/offset misalignment along the shaft center lines (100, 101). The rotating equipment comprises a driver machine (102) with a driver shaft (104) and a driven machine (106) with a driven shaft (108). The driver machine (102) has a driver shaft center line (100) and the driven machine (106) has a driven shaft center line (101). Parallel/offset misalignment occurs when the driver shaft center line (100) is parallel yet offset from the driven shaft centerline (101) as depicted in FIG. 1B. Parallel/offset misalignment is further subcategorized into horizontal and vertical misalignment.

Horizontal misalignment refers to misalignment of the shafts (104, 108) in the horizontal plane whereas vertical misalignment refers to misalignment of the shafts (10, 108) in the vertical plane. Parallel horizontal misalignment may occur when the driver shaft (104) is moved horizontally away from the driven shaft (108) but both shafts (104, 108) still operate in the same horizontal plane and parallel to one another. Parallel vertical misalignment may occur when the driver shaft (104) is moved vertically away from the driven shaft (108) but both shafts (104, 108) still operate in the same vertical plane and parallel to one another.

Figure 1C:
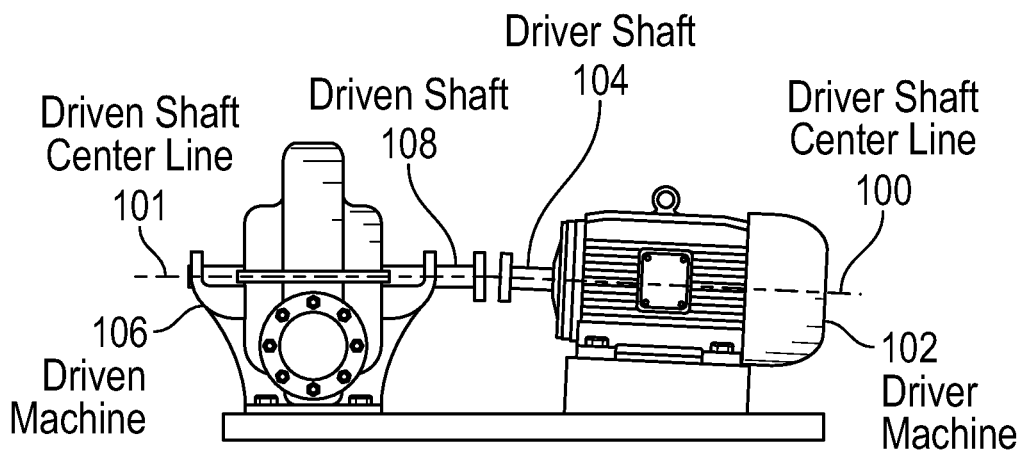

FIG. 1C depicts rotating equipment with angular misalignment along the shaft center lines (100, 101). The rotating equipment comprises a driver machine (102) with a driver shaft (104) and a driven machine (106) with a driven shaft (108). The driver machine (102) has a driver shaft center line (100) and the driven machine (106) has a driven shaft center line (101). Angular misalignment may occur when the driver shaft center line (100) is at an angle to the driven shaft center line (101). Angular misalignment is further subcategorized into horizontal and vertical misalignment.

Angular horizontal misalignment may occur when the driver shaft (104) is at an angle with the driven shaft (108) but both shafts (104, 108) still operate in the same horizontal plane. Angular vertical misalignment may occur when the driver shaft (104) is at an angle with the driven shaft (108) but both shafts (104, 108) still operate in the same vertical plane. When referring to misalignment, embodiments herein may be referring to parallel misalignment, angular misalignment, or a combination of both parallel and angular misalignment.

Figure 2:
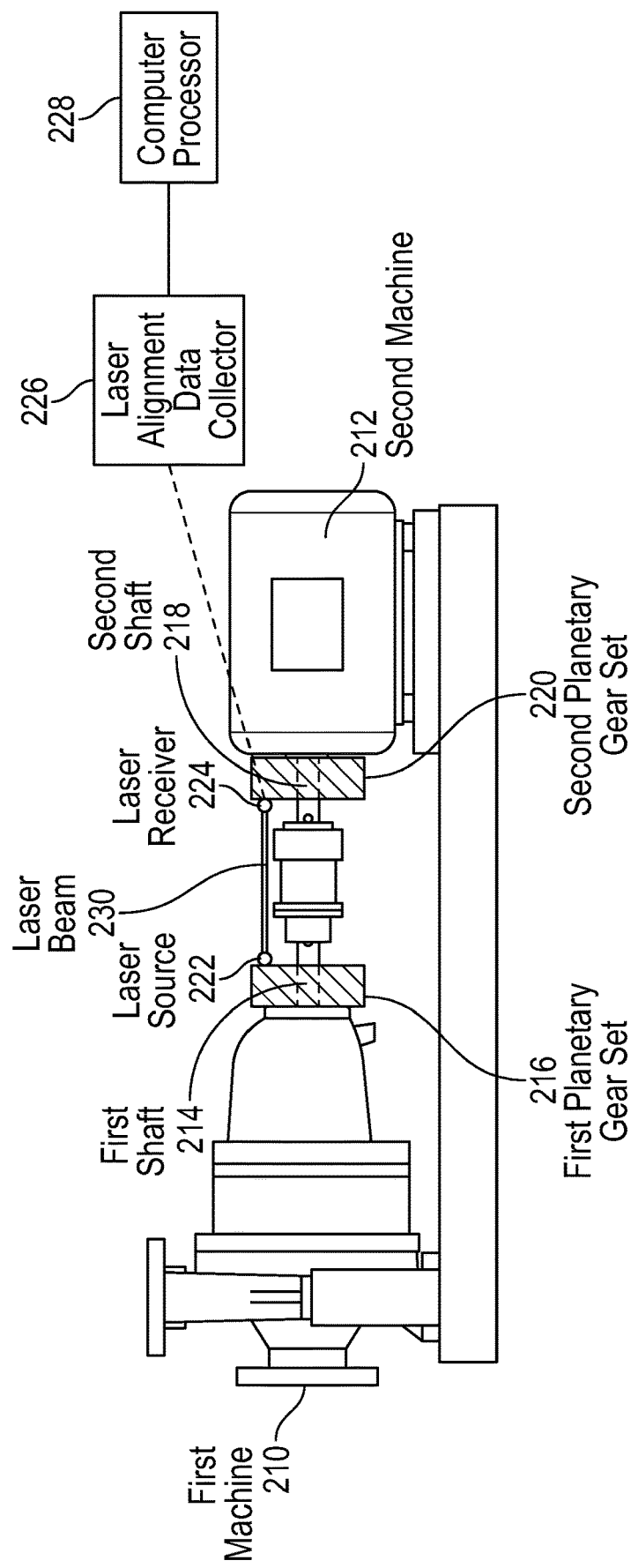
FIG. 2 shows a shaft alignment monitoring system in accordance with one or more embodiments.

FIG. 2 depicts, in one or more embodiments, a shaft alignment monitoring system for rotating equipment. The shaft alignment monitoring system for rotating equipment comprises a first machine (210) and a second machine (212). The first machine (210) may be a driver machine (102) or a driven machine (106) and the second machine (212) may be a driver machine (102) or a driven machine (106). In further embodiments, the first machine (210) may be a driver machine (102) such as a motor, and the second machine (212) may be a driven machine (106) such as a pump, however, any rotating equipment that comprise rotating shafts which are connected to transmit power and speed, such as compressors, turbines, electrical generators, diesel engines, and gearboxes, may be used herein without departing from the scope of this disclosure.

The first machine (210) comprises a first shaft (214) connected to a first planetary gear set (216). The second machine (212) comprises a second shaft (218) connected to a second planetary gear set (220). The first planetary gear set (216) and the second planetary gear set (220) are installed opposite and facing one another along the center lines (100, 101) of the first shaft (214) and the second shaft (218). The first machine (210) may transfer energy to the second machine (212) through the coupling of the first shaft (214) and the second shaft (218). The first shaft (214) may be coupled to the second shaft (218) by a plurality of methods including, but not limited to, beam couplings, bellows couplings, chain couplings, jaw couplings, diaphragm couplings, disc couplings, gear couplings, grid couplings, Oldham couplings, Schmidt couplings, or clamping couplings.

The first shaft (214) and the second shaft (218) operate at speeds up to and including an operating speed. The first planetary gear set (216) comprises a laser source (222) that corresponds with a laser receiver (224) on the second planetary gear set (220). The laser receiver (224) is connected, wired or wirelessly, to a laser alignment data collector (226) which may be connected, wired or wirelessly, to a computer processor (228). The laser source (222) may emit a laser beam (230) that is received at the laser receiver (224). The laser alignment data collector (226) coverts, stores, and monitors laser alignment readings from the laser receiver (224). The computer processor (228) may comprise a screen that allows the laser alignment readings to be visualized.

The laser beam (230) and laser receiver (224) are set up such that the laser beam (230) is situated parallel to the center line (100, 101) of the first shaft (214) and the second shaft (218). If the first machine (210) and the second machine (212) become misaligned, the laser beam (230) will represent the misalignment and the laser alignment data detector (226) will detect and transcribe the misalignment to the computer processor (228). The computer processor (228) allows for continuous monitoring and visualization of the alignment of the rotating equipment by continuous analyzation of the laser beam's (230) reception at the laser receiver (224). Any suitable type of laser source (222) or laser receiver (224) may be used herein without departing from the scope of this disclosure.

Figure 3A:
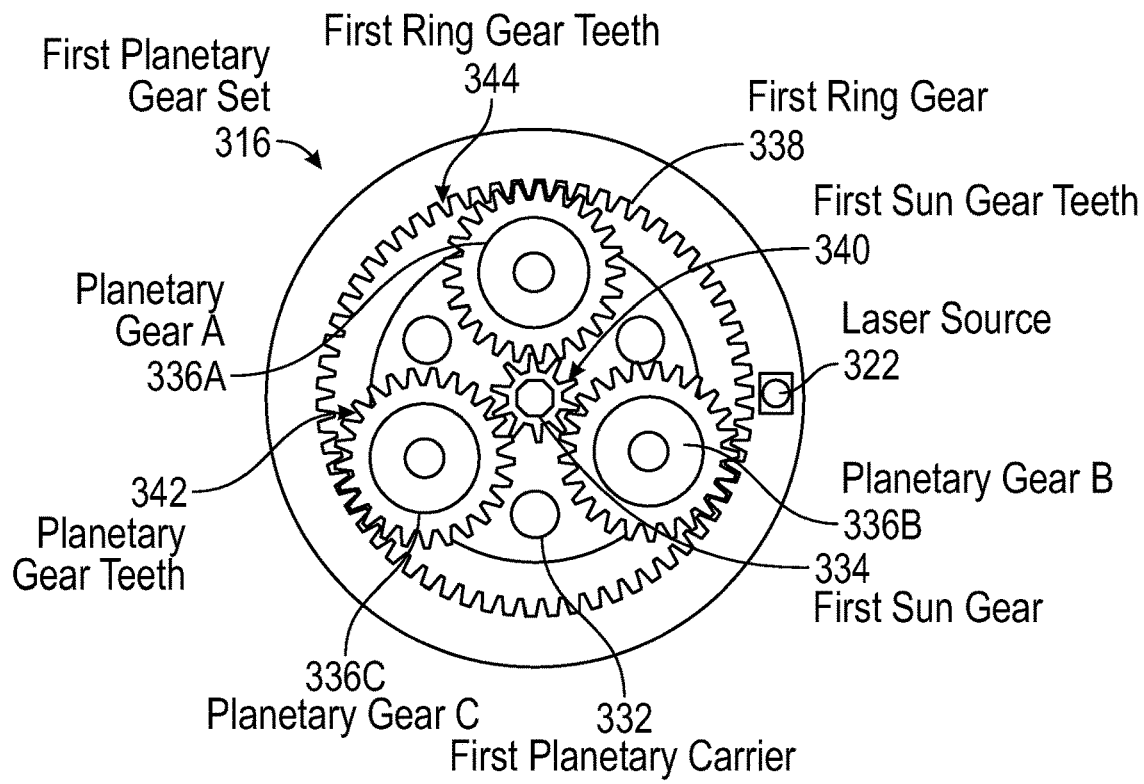
FIG. 3A-3B shows planetary gear sets in accordance with one or more embodiments.

FIG. 3A depicts a first planetary gear set (316). The first planetary gear set (316) is comprised of a first planetary carrier (332), a first sun gear (334), a planetary gear A (336A), a planetary gear B (336B), a planetary gear C (336C), and a first ring gear (338) The first planetary carrier (332) has a geometric center in which the first sun gear (334) is installed. The planetary gear A, B, and C (336A-C) are mounted on the first planetary carrier (332) surrounding the first sun gear (334) at equal intervals in a circumferential direction. The first sun gear (334) comprises first sun gear teeth (340) that are designed to mesh with the planetary gear teeth (342) of the planetary gears A, B, and C (336A-C), and the planetary gear teeth (342) of the planetary gears A, B, and C (336A-C) are designed to mesh with the first ring gear teeth (344) of the first ring gear (338).

As the first sun gear (334) rotates at speeds up to and including an operating speed, the first sun gear teeth (340) mesh with the planetary gear teeth (342) to rotate the planetary gears A, B, and C (336A-C) at a speed slower than the rotational speed of the first sun gear (334). As the planetary gears A, B, and C (336A-C) rotate, the planetary gear teeth (342) mesh with the first ring gear teeth (344) to rotate the first ring gear (338) at a speed slower than the rotational speed of the planetary gears A, B, and C (336A-C). A laser source (322) that can emit a laser beam (230) is installed on the surface of the first ring gear (338).

Figure 3B:
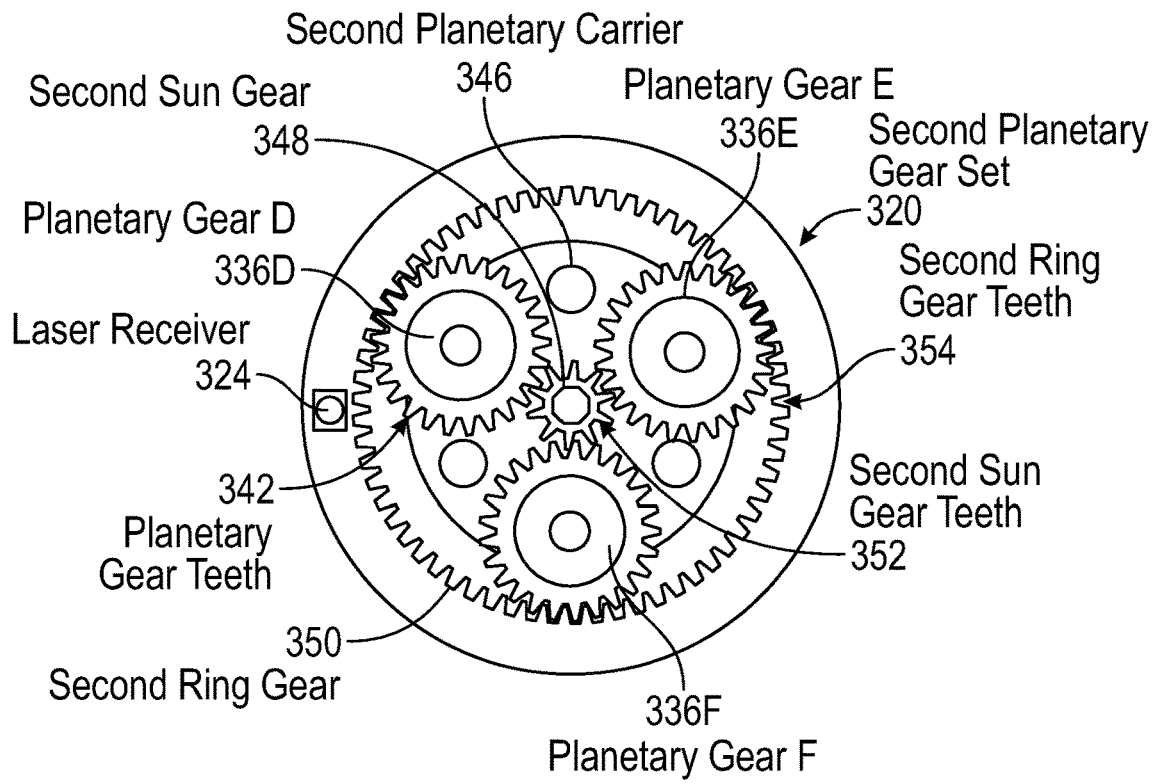

FIG. 3B depicts a second planetary gear set (320). The second planetary gear set (320) is comprised of a second planetary carrier 346), a second sun gear (348), a planetary gear D (336D), a planetary gear E (336E), a planetary gear F (336F), and a second ring gear (350). The second planetary carrier (346) has a geometric center in which the second sun gear (348) is installed. The planetary gear D, E, and F (336D-F) are mounted on the second planetary carrier (346) surrounding the second sun gear (348) at equal intervals in a circumferential direction. The second sun gear (348) comprise second sun gear teeth (352) that are designed to mesh with the planetary gear teeth (342) of the planetary gears D, E, and F (336D-F), and the planetary gear teeth (342) of the planetary gears D, E, and F (336D-F) are designed to mesh with the second ring gear teeth (354) of the second ring gear (350).

As the second sun gear (348) rotates at speeds up to and including an operating speed, the second sun gear teeth (352) mesh with the planetary gear teeth (342) to rotate the planetary gears D, E, and F (336D-F) at a speed slower than the rotational speed of the second sun gear (348). As the planetary gears D, E, and F (336D-F) rotate, the planetary gear teeth (342) mesh with the second ring gear teeth (354) to rotate the second ring gear (350) at a speed slower than the rotational speed of the planetary gears D, E, and F (336D-F). A laser receiver (324), that can receive a laser beam (230) emitted from the laser source (322), is installed on the surface of the second ring gear (350). The present disclosure depicts the planetary gear sets (316, 320) as having three planetary gears (336A-F) each, however, any number of planetary gears (336A-F) of any size may be used without departing from the scope of this disclosure herein.

Figure 4:
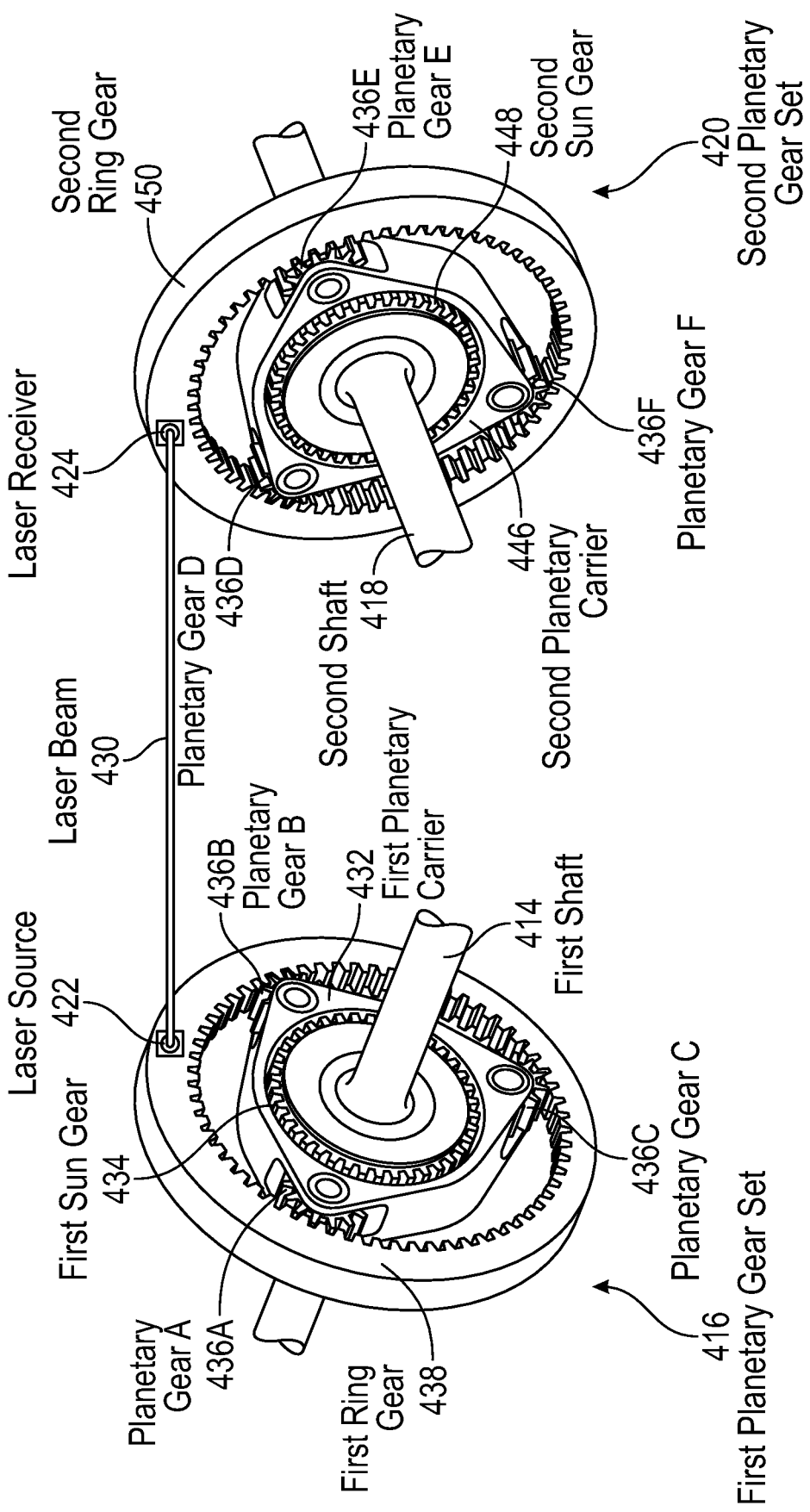
FIG. 4 shows a laser system integrated with planetary gear sets in accordance with one or more embodiments.

FIG. 4 depicts a first planetary gear set (416) connected to a first shaft (414), a second planetary gear set (420) connected to a second shaft (418), and a laser system's interaction between the two planetary gear sets (416, 420). The first planetary gear set (416) is comprised of a first planetary carrier (432), a first sun gear (434), a planetary gear A (436A), a planetary gear B (436B), a planetary gear C (436C), and a first ring gear (438) The first planetary carrier (432) has a geometric center in which the first sun gear (434) is installed. A first shaft (414) runs through the center of the first sun gear (434) and an inner perimeter of the first sun gear (434) is fixed to an outer perimeter of the first shaft (414).

As the first shaft (414) rotates at a speed up to and including an operating speed, the first sun gear (434) rotates at the same speed. As the first sun gear (434) rotates, the planetary gears A, B, and C (436A-C) will begin to rotate at a speed lower than the rotational speed of the first sun gear (434). The planetary gears A, B, and C's (436A-C) rotation causes the first ring gear (438) to rotate at a speed less than the rotational speed of the planetary gears A, B, and C (436A-C). A laser source (422), with the ability to emit a laser beam (430), is installed on the surface of the first ring gear (438).

The second planetary gear set (420) is comprised of a second planetary carrier (446), a second sun gear (448), a planetary gear D (436D), a planetary gear E (436E), a planetary gear F (436F), and a second ring gear (450) The second planetary carrier (446) has a geometric center in which the second sun gear (448) is installed. A second shaft (418) runs through the center of the second sun gear (448) and an inner perimeter of the second sun gear (448) is fixed to an outer perimeter of the second shaft (418).

As the second shaft (418) rotates at a speed up to and including an operating speed, the second sun gear (448) rotates at the same speed. As the second sun gear (448) rotates, the planetary gears D, E, and F (436D-F) rotate at a speed lower than the rotational speed of the second sun gear (448). The planetary gears D, E, and F's (436D-F) rotation causes the second ring gear (450) to rotate at a speed less than the rotational speed of the planetary gears D, E, and F (436D-F). A laser receiver (424), with the ability to receive the laser beam (430) emitted by the laser source (422), is installed on the surface of the second ring gear (450).

The first planetary gear set (416) and the second planetary gear set (420) are designed such that the first ring gear (438) and the second ring gear (450) rotate at the same speed. The laser source (422) may emit a laser beam (430) that is received at the laser receiver (424). The laser beam (430) and laser receiver (424) are set up such that the laser beam (430) is situated parallel to the center line (100, 101) of the first shaft (414) and the second shaft (418). If the first shaft (414) and the second shaft (418) become misaligned, this misalignment will be represented in the laser beam (430) reception at the laser receiver (424).

Figure 5:
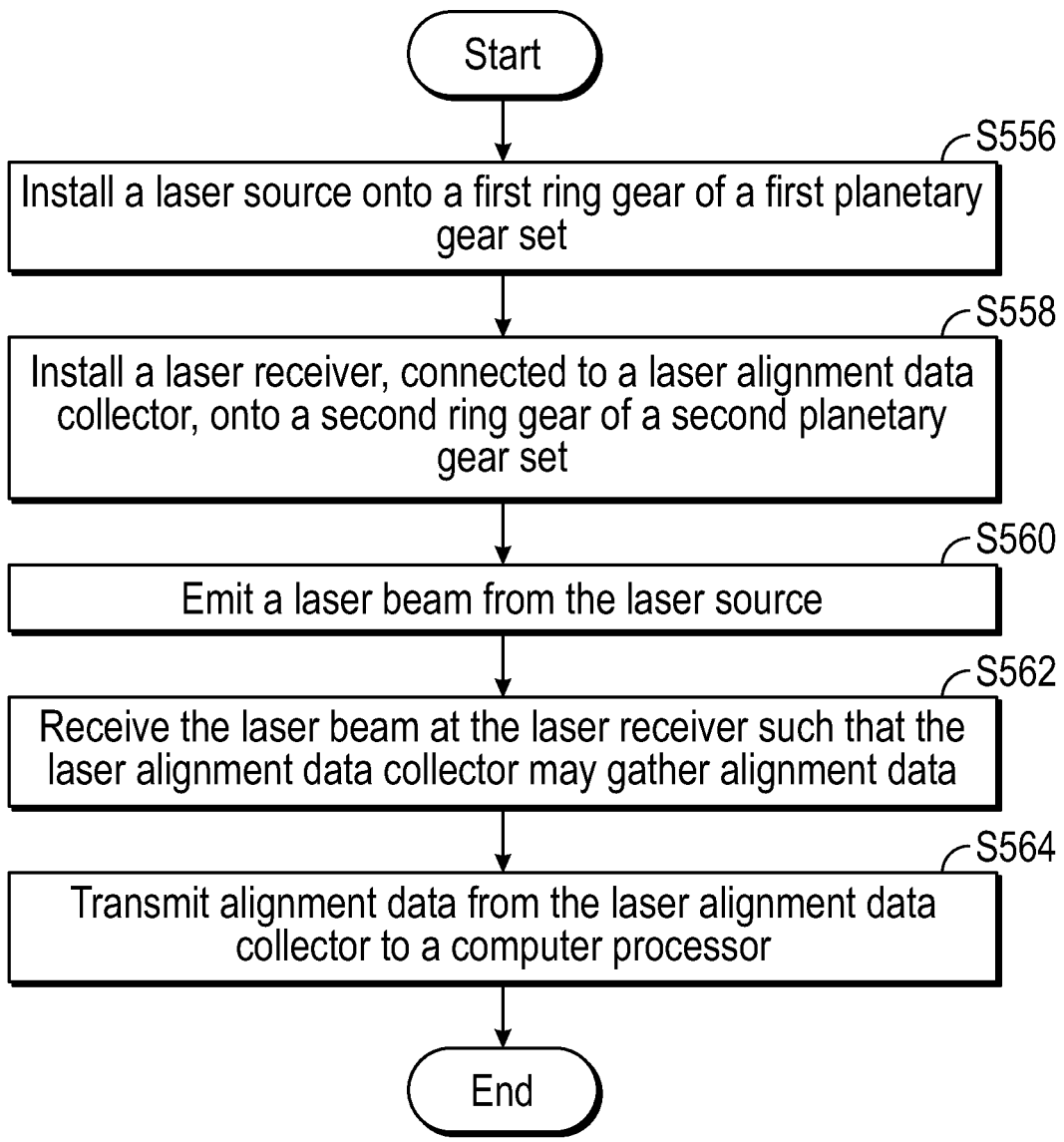
FIG. 5 shows a flowchart in accordance with one or more embodiments.

FIG. 5 depicts a flowchart in accordance with one or more embodiments. More specifically, FIG. 5 illustrates a method for monitoring shaft alignment while rotating equipment is operating. While the various blocks of FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a laser source (222, 322, 422) is installed on a first ring gear (338, 438) of a first planetary gear set (216, 316, 416) (S556), and a laser receiver (224, 324, 424), connected to a laser alignment data collector (226), is installed onto a second ring gear (350, 450) of a second planetary gear set (220, 320, 420) (S558). The first planetary gear set (216, 316, 416) further comprises a first planetary carrier (332, 432), a first sun gear (334, 434), a planetary gear A (336A, 436A), a planetary gear B (336B, 436B), and a planetary gear C (336C, 436C). The first planetary carrier (332, 432) has a geometric center in which the first sun gear (334, 434) is installed. A first shaft (214, 414), attached to a first machine (210), runs through a center of the first sun gear (334, 434). An inner perimeter of the first sun gear (334, 434) is fixed to an outer perimeter of the first shaft (214, 414). The planetary gear A, B, and C (336A-C, 436 A-C) are mounted on the first planetary carrier (332, 432) surrounding the first sun gear (334, 434) at equal intervals in a circumferential direction.

The first sun gear (334, 434) comprises first sun gear teeth (340) that are designed to mesh with the planetary gear teeth (342) of the planetary gears A, B, and C (336A-C, 436 A-C), and the planetary gear teeth (342) of the planetary gears A, B, and C (336A-C, 436 A-C) are designed to mesh with the first ring gear teeth (344) of the first ring gear (338, 438). As the first shaft (214, 414) rotates at a speed up to and including an operating speed, the first sun gear (334, 434) rotates at the same speed. As the first sun gear (334, 434) rotates, the planetary gears A, B, and C (336A-C, 436 A-C) will begin to rotate at a speed lower than the rotational speed of the first sun gear (334, 434). The planetary gears A, B, and C's (336A-C, 436 A-C) rotation causes the first ring gear (338, 438) to rotate at a speed less than the rotational speed of the planetary gears A, B, and C (336A-C, 436 A-C).

The second planetary gear set (220, 320, 420) further comprises a second planetary carrier (346, 446), a second sun gear (348, 448), a planetary gear D (336D, 436D), a planetary gear E (336E, 436E), and a planetary gear F (336F, 436F). The second planetary carrier (346, 446) has a geometric center in which the second sun gear (348, 448) is installed. A second shaft (218, 418), attached to a second machine (212), runs through a center of the second sun gear (348, 448). An inner perimeter of the second sun gear (348, 448) is fixed to an outer perimeter of the second shaft (218, 418). The planetary gear D, E, and F (336 D-F, 436 D-F) are mounted on the second planetary carrier (346, 446) surrounding the second sun gear (348, 448) at equal intervals in a circumferential direction.

The second sun gear (348, 448) comprises second sun gear teeth (352) that are designed to mesh with the planetary gear teeth (342) of the planetary gears D, E, and F (336 D-F, 436 D-F), and the planetary gear teeth (342) of the planetary gears D, E, and F (336 D-F, 436 D-F) are designed to mesh with the second ring gear teeth (354) of the second ring gear (350, 450). As the second shaft (218, 418) rotates at a speed up to and including an operating speed, the second sun gear (348, 448) rotates at the same speed. As the second sun gear (348, 448) rotates, the planetary gears D, E, and F (336 D-F, 436 D-F) will begin to rotate at a speed lower than the rotational speed of the second sun gear (348, 448). The planetary gears D, E, and F's (336 D-F, 436 D-F) rotation causes the second ring gear (350, 450) to rotate at a speed less than the rotational speed of the planetary gears D, E, and F (336 D-F, 436 D-F).

The first machine (210) may be a driver machine (102) or a driven machine (106) and the second machine (212) may be a driver machine (102) or a driven machine (106). In further embodiments, the first machine (210) may be a driver machine (102) such as a motor, and the second machine (212) may be a driven machine (106) such as a pump. The first shaft (214, 414) is coupled to the second shaft (218, 418) such that the rotation of the first shaft (214, 414) causes the second shaft (218, 418) to rotate at the same speed. The laser source (222, 322, 422) and laser receiver (224, 324, 424) are installed facing each other parallel to the center lines (100, 101) of the shafts (214, 414, 218, 418). The first ring gear (338, 438) and the second ring gear (350, 450) rotate at the same speed.

A laser beam (230, 430) is emitted from the laser source (S560), and the laser beam (230, 430) is received at the laser receiver (224, 324, 424) such that the laser alignment data collector (226) may gather alignment data (S562). The alignment data is transmitted from the laser alignment data collector (226) to a computer processor (228) (S564). The computer processor (228) allows for continuous monitoring of the alignment of the rotating equipment by continuous analyzation of the reception of the laser beam (230, 430) at the laser receiver (224, 324, 424). Upon start up, the laser beam (230, 430) is used to ensure the center lines (100, 101) of the first shaft (214, 414) and the second shaft (218, 418) are in in line such that the rotating equipment is properly aligned. While the rotating equipment is operating, the laser beam (230, 430) continuously depicts the alignment of the shafts (100, 101). If the first shaft (214, 414) and the second shaft (218, 418) become misaligned, the laser beam (230, 430) will represent the misalignment and the laser alignment data detector (226) will detect and transcribe the misalignment to the computer processor (228). Although the embodiments disclosed previously describe the laser source (222, 322, 422) and the laser receiver (224, 324, 424) as being installed on the ring gear (338, 438, 350, 450), the laser source (222, 322, 422) and the laser receiver (224, 324, 424) may be installed elsewhere on the planetary gear set (216, 316, 416, 220, 320, 420), such as the planetary carrier (332, 432, 346, 446), without departing from the scope of this disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A system for shaft alignment monitoring comprising:
    a first planetary gear set comprising:
        a first sun gear, having first sun gear teeth, designed to rotate at an operating speed of rotating equipment,
        at least one planetary gear, having planetary gear teeth, and
        a first ring gear, having first ring gear teeth, designed to rotate at a speed lower than the operating speed of the rotating equipment,
    a second planetary gear set comprising:
        a second sun gear, having second sun gear teeth, designed to rotate at the operating speed of the rotating equipment,
        at least one planetary gear, having planetary gear teeth, and
        a second ring gear, having second ring gear teeth, designed to rotate at a speed lower than the operating speed of the rotating equipment,
    at least one laser source installed on the first ring gear of the first planetary gear set, and
    at least one laser receiver installed on the second ring gear of the second planetary gear set,
    wherein the at least one laser source corresponds with the at least one laser receiver to measure alignment readings while the rotating equipment is rotating at speeds up to and including the operating speed, and
    wherein the alignment readings are read and processed by a laser alignment data collector connected to a computer processor.

2. The system of claim 1,
wherein the rotating equipment further comprises:
a first machine comprising a first shaft and
a second machine comprising a second shaft,
wherein the first shaft and the second shaft rotate at speeds up to and including the operating speed.

3. The system of claim 2,
wherein the first planetary gear set further comprises:
a first planetary carrier
a planetary gear A,
a planetary gear B, and
a planetary gear C,
wherein the first sun gear is fixed to the first shaft of the first machine.

4. The system of claim 3,
wherein the first planetary carrier is designed with a center and the first sun gear is installed in the center with the planetary gear A, planetary gear B, and planetary gear C installed on the first planetary carrier surrounding the first sun gear at equal intervals in a circumferential direction.

5. The system of claim 4,
wherein the planetary gear teeth of the planetary gear A, the planetary gear B, and the planetary gear C mesh with the first sun gear teeth in order for the planetary gear A, the planetary gear B, and the planetary gear C to rotate at a speed slower than the operating speed.

6. The system of claim 5,
wherein the planetary gear teeth of the planetary gear A, the planetary gear B, and the planetary gear C mesh with the first ring gear teeth in order for the first ring gear to rotate at a speed slower than the speed of rotation of the planetary gear A, the planetary gear B, and the planetary gear C.

7. The system of claim 2,
wherein the second planetary gear set further comprises:
a second planetary carrier
a planetary gear D,
a planetary gear E, and
a planetary gear F,
wherein the second sun gear is fixed to the second shaft of the second machine.

8. The system of claim 7,
wherein the second planetary carrier is designed with a center and the second sun gear is installed in the center with the planetary gear D, planetary gear E, and planetary gear F installed on the second planetary carrier surrounding the second sun gear at equal intervals in a circumferential direction.

9. The system of claim 8,
wherein the planetary gear teeth of the planetary gear D, the planetary gear E, and the planetary gear F mesh with the second sun gear teeth in order for the planetary gear D, the planetary gear E, and the planetary gear F to rotate at a speed slower than the operating speed.

10. The system of claim 9,
wherein the planetary gear teeth of the planetary gear D, the planetary gear E, and the planetary gear F mesh with the second ring gear teeth in order for the second ring gear to rotate at a speed slower than the speed of rotation of the planetary gear D, the planetary gear E, and the planetary gear F.

11. A method for shaft alignment monitoring comprising:
installing a laser source onto a first ring gear of a first planetary gear set wherein the first ring gear has first ring gear teeth and the first planetary gear set comprises at least one planetary gear having planetary gear teeth,
installing a laser receiver, connected to a laser alignment data collector, onto a second ring gear of a second planetary gear set wherein the second ring gear has second ring gear teeth and the second planetary gear set comprises at least one planetary gear having planetary gear teeth,
emitting a laser beam from the laser source, and
receiving the laser beam at the laser receiver such that the laser alignment data collector processes reception of the laser beam and transmits alignment data to a computer processor,
wherein the first planetary gear set and the second planetary gear set are installed opposite and facing one another in rotating equipment, and
wherein the rotating equipment is rotating at a speed up to and including an operating speed and the first ring gear and the second ring gear are rotating at a speed less than the speed of the rotating equipment.

12. The method of claim 11,
wherein the rotating equipment further comprises:
a first machine comprising a first shaft and
a second machine comprising a second shaft,
wherein the first shaft and the second shaft rotate at speeds up to and including the operating speed.

13. The method of claim 12,
wherein the first planetary gear set further comprises:
a first planetary carrier,
a first sun gear having first sun gear teeth,
a planetary gear A,
a planetary gear B, and
a planetary gear C,
wherein the first sun gear is fixed to the first shaft of the first machine.

14. The method of claim 13,
wherein the first planetary carrier is designed with a center and the first sun gear is installed in the center with the planetary gear A, planetary gear B, and planetary gear C installed on the first planetary carrier surrounding the first sun gear at equal intervals in a circumferential direction.

15. The method of claim 14,
wherein the planetary gear teeth of the planetary gear A, the planetary gear B, and the planetary gear C mesh with the first sun gear teeth in order for the planetary gear A, the planetary gear B, and the planetary gear C to rotate at a speed slower than the operating speed.

16. The method of claim 15,
wherein the planetary gear teeth of the planetary gear A, the planetary gear B, and the planetary gear C mesh with the first ring gear teeth in order for the first ring gear to rotate at a speed slower than the speed of rotation of the planetary gear A, the planetary gear B, and the planetary gear C.

17. The method of claim 12,
wherein the second planetary gear set further comprises:
a second planetary carrier,
a second sun gear having second sun gear teeth,
a planetary gear D,
a planetary gear E, and
a planetary gear F,
wherein the second sun gear is fixed to the second shaft of the second machine.

18. The method of claim 17,
wherein the second planetary carrier is designed with a center and the second sun gear is installed in the center with the planetary gear D, planetary gear E, and planetary gear F installed on the second planetary carrier surrounding the second sun gear at equal intervals in a circumferential direction.

19. The method of claim 18,
wherein the planetary gear teeth of the planetary gear D, the planetary gear E, and the planetary gear F mesh with the second sun gear teeth in order for the planetary gear D, the planetary gear E, and the planetary gear F to rotate at a speed slower than the operating speed.

20. The method of claim 19,
wherein the planetary gear teeth of the planetary gear D, the planetary gear E, and the planetary gear F mesh with the second ring gear teeth in order for the second ring gear to rotate at a speed slower than the speed of rotation of the planetary gear D, the planetary gear E, and the planetary gear F.

* * * * *